J. W. HYATT, Jr.

Manufacture of Dominoes.

No. 5,760. Reissued Feb. 10, 1874

Witnesses:

Ernst Bilhuber

Henry Linnes.

Inventor:

John W. Hyatt Jr.

per

Van Santvoord & Hauff

Attys

UNITED STATES PATENT OFFICE.

JOHN W. HYATT, JR., OF ALBANY, NEW YORK, ASSIGNOR TO THE EMBOSSING COMPANY, OF SAME PLACE.

IMPROVEMENT IN THE MANUFACTURE OF DOMINOS.

Specification forming part of Letters Patent No. 91,235, dated June 15, 1869; reissue No. 5,760, dated February 10, 1874; application filed January 16, 1874.

*To all whom it may concern:*

Be it known that I, JOHN W. HYATT, Jr., of the city and county of Albany, State of New York, have invented a new and useful Improvement in the Manufacture of Dominos; and I do hereby declare the following to be a full, clear, and exact description thereof, which will enable those skilled in the art to make and use the same, reference being had to the accompanying drawing, forming part of this specification.

To enable others skilled in the art to make and use my invention, I will proceed to describe the process of making the article.

My invention consists in a domino made by pressing or stamping a block of wood in a suitable die or mold, so as to press the block into the required form, the block being so prepared that the grain of the wood is perpendicular to the face and back of the block, and the pressure being made endwise of the grain. By these means I bring the block to the required form, and produce on its face, by impression from the die, the pivotal point or center pin in relief, and also cavities for the cross-bar and spots of the domino. These cavities are afterward filled with enamel, white or colored, as hereinafter mentioned.

Figure 1:
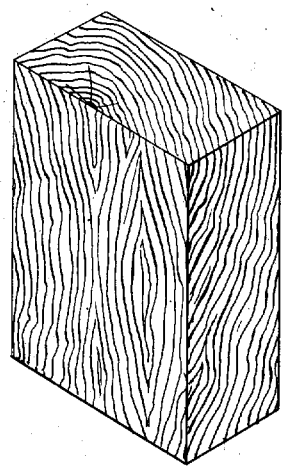
Figure 2:
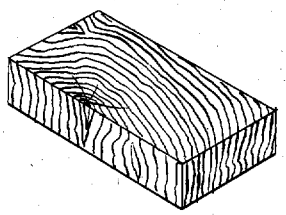
Figure 3:
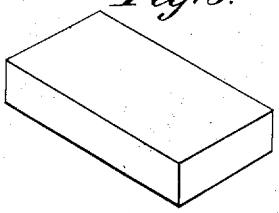
Figure 4:
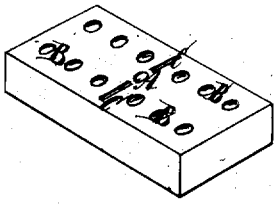

Figure 1 is a strip of wood of a thickness slightly in excess of the proposed width of the domino, and of a width slightly in excess of the proposed length of the domino. Fig. 2 is a section sawed from the strip shown in Fig. 1, taking so much of the strip as will make a block slightly thicker than the finished domino, with the grain of the wood running perpendicular to the face and back thereof. Fig. 3 is the block shown in Fig. 2 after having been colored. Fig. 4 represents the block after having been pressed in a suitable die or mold, which confines the block of wood on its side grain firmly while it is being pressed on its end grain into the required form, leaving the center pin A in relief, and forming cavities C for the cross-bar, and cavities B for the spots, in the numbers required.

Figure 5:
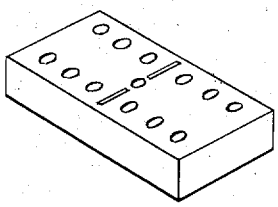

This stamped block, after having its pores filled with linseed-oil, shellac, varnish, or other substance, to protect it from the wet, and enable it to receive a polish, is laid with the face upward, and the cavities B and C are filled with a white or colored enamel, preferably made of any suitable pigment, white lead, vermilion, carmine, &c., according to the color required, ground in fine quick-drying varnish, of proper consistency to form a drop of the right size to fill the cavity. This enamel is allowed to dry, and the article is finished, as clearly shown, in perspective, by Fig. 5.

The advantages of this invention are, cheapness and rapidity of construction, exact uniformity in size, and greatly increased hardness of the wood, so that the domino is not easily bruised, scratched, or otherwise marked.

Having thus described my invention, what I claim as new, and desire to secure by Letters Patent, is—

1. A domino formed from a wooden blank by pressure in a suitable die or mold endwise of the grain of the wood, substantially as described.

2. A wooden domino having the pivotal point A embossed thereon, substantially as described.

3. A wooden domino formed by endwise pressure, and provided with cavities for the spots pressed on its face in the number required, substantially as described.

4. A wooden domino formed by endwise pressure, and provided with cavities pressed on its face for the cross-bars, substantially as described.

5. A wooden domino formed by pressure, as described, and provided with cavities for the spots and cross-bar, enameled substantially as described.

JOHN W. HYATT, JR.

Witnesses:
CHAS. E. HILL,
D. L. SAFFORD.